Figure 1:
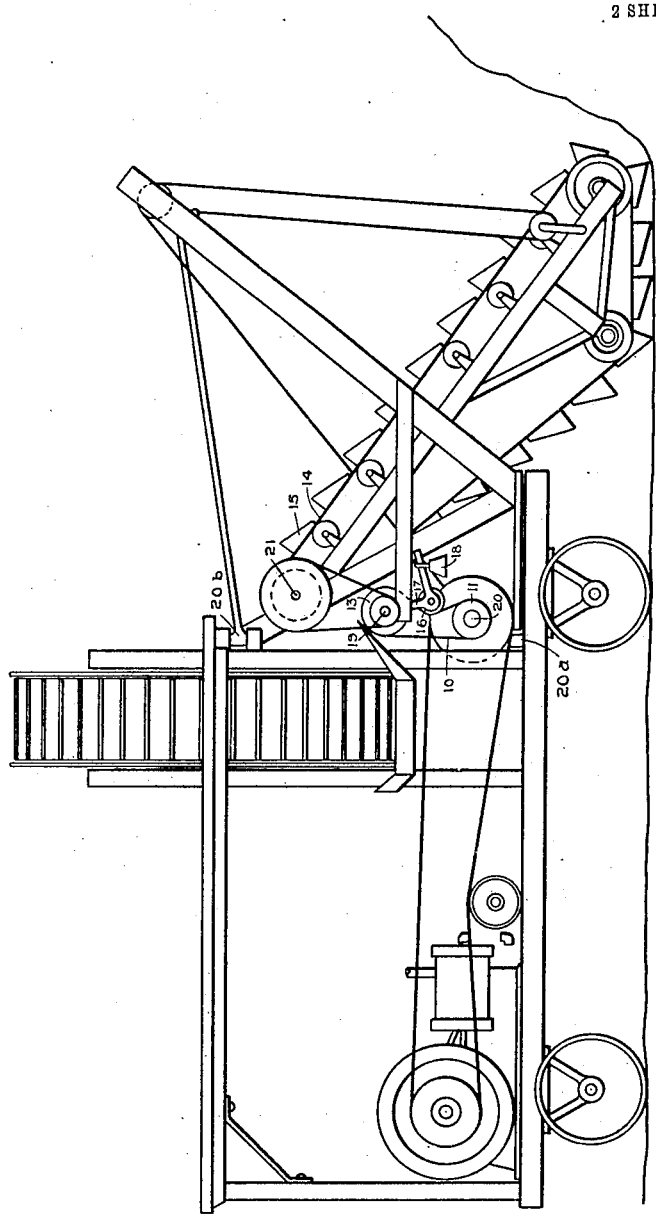

No. 892,806. PATENTED JULY 7, 1908.
C. H. CALESON.
CHAIN DRIVE FOR EXCAVATORS.
APPLICATION FILED JAN. 4, 1908.

2 SHEETS—SHEET 1.

WITNESSES:

INVENTOR

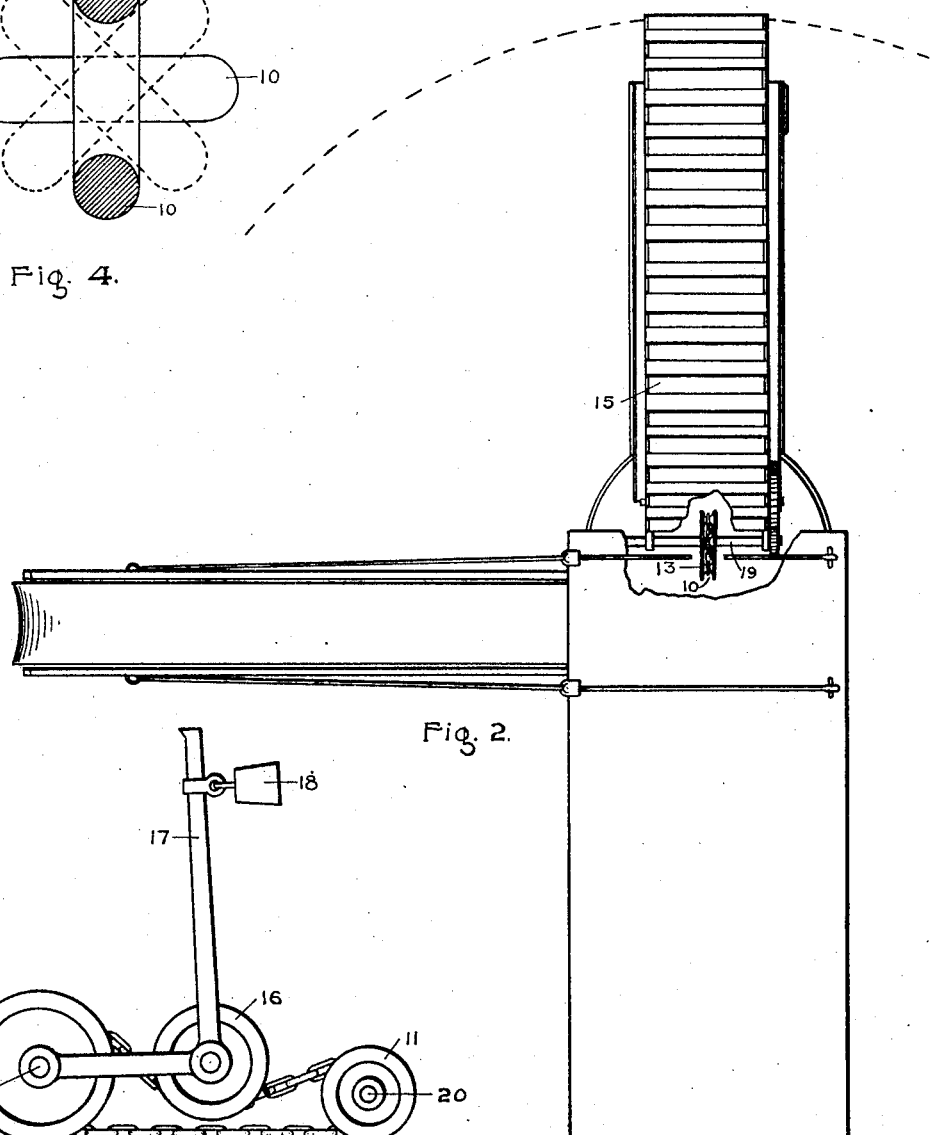

UNITED STATES PATENT OFFICE.

CHRISTOPHER H. CALESON, OF SPOKANE, WASHINGTON.

CHAIN-DRIVE FOR EXCAVATORS.

No. 892,806.  Specification of Letters Patent.  Patented July 7, 1908.

Application filed January 4, 1908. Serial No. 409,360.

*To all whom it may concern:*

Be it known that I, CHRISTOPHER H. CALESON, a citizen of the United States, residing at Spokane, in the county of Spokane and State of Washington, have invented a new and useful Chain-Drive for Excavators, of which the following is a specification.

My invention relates to a chain drive for chain and bucket excavators wherein the motor shaft of the machine is mounted in fixed relation with a carriage or support, and the bucket ladder or frame swings in the arc of a circle about said support.

My invention consists in the combination of a drive sprocket arranged in a plane fixed with relation to a suitable support, or driven sprocket mounted to swing on said support, and a chain operatively connecting said sprockets.
The invention also consists in the sprocket in a fixed plane, the swinging sprocket and the chain or belt tightener described.

Figure 1 is a side elevation of the entire machine. Fig. 2 is a top view of the machine. Fig. 3 is a detail of my driving mechanism and Fig. 4 a portion of the chain, showing by dotted lines the twisting movement the chain is capable of and operative under.
Similar numerals of reference refer to similar parts throughout the several views.

The chain sheave 11 is the drive sheave on my machine, 13 the driven sheave and connected to 11 by the cable chain 10. The shaft 20, fixedly connected to sheave 11, is operatively fastened to the body of the machine with proper journals. The shaft 19, fixedly connected to 13, is supported on the frame work of the excavator portion bucket frame and operated thereon. These shafts are located in such manner that the driving side of the cable chain 10 is directly in line with the pivots 20 and 20ª of the excavator or bucket frame, so that when the excavator portion is swung about, the chain on its driving side will twist and assume such positions as are shown by dotted lines in Fig. 4 allowing the shafts 19 and 20 to be out of alinement but the driving to continue steadily and without interruption. As there will be a slight change in the length of the chain caused by the twisting movement it is necessary to have the cable chain a little longer than ordinarily, and to keep this chain in the proper working condition, I provide the idler 16, hinged at 19 and supported on a bracket 17. To a projecting arm on this bracket is hinged a weight 18 which may be moved along said arm to adjust and give to the chain the proper tension. The driven shaft 19 as aforementioned is journaled to the pivoted excavator portion or bucket ladder of my machine. To drive the endless belt 14, I may use an ordinary chain or belt drive between the shafts 19 and 21, such as to give the required speed. These two shafts always being equidistant.

Changes in form, proportion, size and minor details of construction within the scope of the appended claims may be resorted to without departing from the spirit or sacrificing any of the advantages of this invention.

Having thus described my invention, what I claim as new, and desire to secure by Letters Patent, is—

1. In an endless chain and bucket excavator the combination of a drive sprocket arranged in a plane fixed with relation to a suitable support, a driven sprocket mounted to swing on said support, and a chain operatively connecting said sprockets.

2. In an endless chain and bucket excavator the combination of a sprocket in a fixed plane, a swinging sprocket, a chain operatively connecting said sprockets, a chain tightener operating on said chain, all substantially as set forth.

In testimony whereof I have hereunto set my hand in the presence of two subscribing witnesses.

CHRISTOPHER H. CALESON.

Witnesses:
 J. W. VOELLMECK,
 H. E. SMITH.